United States Patent
Barak et al.

(10) Patent No.: US 6,792,093 B2
(45) Date of Patent: Sep. 14, 2004

(54) SYSTEM AND METHOD FOR TELEPHONE CALL RECORDING AND RECORDED CALL RETRIEVAL

(76) Inventors: Zvi Barak, Hashcafim 46, Ra-anana 43724 (IL); Sarah Barak, Hashcafim 46, Ra-anana 43724 (IL); Gad Barak, Hashcafim 46, Ra-anana 43724 (IL)

( * ) Notice: Subject to any disclaimer, the term of this patent is extended or adjusted under 35 U.S.C. 154(b) by 120 days.

(21) Appl. No.: 09/912,752

(22) Filed: Jul. 25, 2001

(65) Prior Publication Data

US 2002/0067810 A1 Jun. 6, 2002

Related U.S. Application Data (60) Provisional application No. 60/251,046, filed on Dec. 5, 2000.

(51) Int. Cl.[7] ............................................... H04M 3/42
(52) U.S. Cl. ........................... 379/202.01; 379/203.01; 379/204.01; 379/205.01; 379/207.02
(58) Field of Search .......................... 379/67.1, 68, 84, 379/85, 88.19, 88.27, 88.25, 202.01, 207.02, 114.2, 114.01, 158, 207.01, 203.01, 204.01, 205.01, 206.01, 210.01

(56) References Cited

U.S. PATENT DOCUMENTS

| | | | | |
|---|---|---|---|---|
| 5,414,754 A | * | 5/1995 | Pugh et al. ............... | 379/88.23 |
| 5,483,588 A | | 1/1996 | Eaton et al. ................ | 379/902 |
| 5,839,067 A | | 11/1998 | Jonsson ..................... | 455/422 |
| 5,848,132 A | * | 12/1998 | Morley et al. ......... | 379/210.01 |
| 5,867,562 A | | 2/1999 | Scherer ...................... | 379/88 |
| 5,995,824 A | | 11/1999 | Whitfield .................. | 455/412 |
| 6,038,307 A | | 3/2000 | Fahrer et al. .............. | 379/209 |
| 6,192,123 B1 | * | 2/2001 | Grunsted et al. ....... | 379/201.01 |
| 6,522,876 B1 | * | 2/2003 | Weiland et al. .......... | 455/414.1 |
| 2001/0038689 A1 | * | 11/2001 | Liljestrand et al. ..... | 379/201.03 |
| 2002/0136374 A1 | | 9/2002 | Fleischer, III et al. .. | 379/114.01 |

FOREIGN PATENT DOCUMENTS

| | | | | |
|---|---|---|---|---|
| WO | WO 98/04077 | * | 1/1998 | ............ H04M/3/00 |
| WO | WO 98/39901 | * | 9/1998 | ............ H04M/3/42 |

* cited by examiner

*Primary Examiner*—Fan Tsang
*Assistant Examiner*—Ovidio Escalante
(74) *Attorney, Agent, or Firm*—Gordon & Jacobson, PC

(57) ABSTRACT

A telephone call recording and recorded call retrieval system records telephone conversations and stores the recorded conversations for later retrieval. The system includes on one or more servers coupled to the PSTN, but preferably separate from mobile and land-based telephone company switches. A first server includes telephony, call recording, and call conferencing functionality. A subscriber calls an access telephone number for the first server and is routed to the server by the PSTN. The subscriber has several options with respect to the type of recording: dictation-type recording, automatic recording upon dialing and answer by a called party, or selective recording of any portion of a conversation upon activation of pre-assigned keys on the telephone. The recorded calls are then stored for later retrieval by the subscriber, e.g., on a storage server. The system may be used from both land-based and mobile telephones.

7 Claims, 6 Drawing Sheets

SYSTEM AND METHOD FOR TELEPHONE CALL RECORDING AND RECORDED CALL RETRIEVAL

This application claims priority from U.S. provisional application Serial No. 60/251,046, filed Dec. 5, 2000, and entitled "A System and Method for Recording Telephone Calls", which is hereby incorporated by reference herein in its entirety.

BACKGROUND OF THE INVENTION

1. Field of the Invention

This invention relates broadly to telecommunications systems. More particularly, this invention relates to recording telephone conversations, or portions thereof, and later retrieving the recorded conversations for audio playback or transcriptions thereof.

2. State of the Art

There is often a need to record information learned during a telephone conversation or a portion of a telephone conversation. Commonly, the information is written down on a piece of paper and later reviewed to retrieve the desired information. For example, it may be desirable to record a simple list of items stated by one party to a conversation to the other party in the conversation. Moreover, it may be desirable at times to record a complex fact situation or other lengthy discussion, such as a discussion between an attorney and a client. While paper recording may be suitable at times, it is, for more complex discussions, generally an incomplete record of the details discussed. Moreover, paper and pen are not always available or safe to use, e.g., when driving and talking on a cellular telephone.

U.S. Pat. No. 5,995,824 to Whitfield discloses a recording system for recording segments of a conversation while talking on a cellular telephone. In a first embodiment, the cellular telephone implements a recording function upon the actuation of one or more keys and the recording is carried out by and stored within the telephone, without using any external system. In a second embodiment, the recording is initiated by actuation of a key or keys on the telephone, but the recording is stored for later retrieval in the mobile services network. In either embodiment, the recording service is limited to cellular telephones, and recordings cannot be made and/or retrieved with a telephone outside the cellular service. In addition, the only way to retrieve the recordings is via voice mail retrieval using the cellular telephone.

SUMMARY OF THE INVENTION

It is therefore an object of the invention to provide a universal telephone call recording and recorded call retrieval system which operates with any telephone, whether land-based or mobile, and whether from the user's home or office, a pay phone or other location.

It is another object of the invention to provide a telephone call recording and recorded call retrieval system which can function as a stand alone service from the telephone companies.

It is a further object of the invention to provide a telephone call recording and recorded call retrieval system which can be integrated into the services provided by telephone companies.

It is an additional object of the invention to provide a telephone call recording and recorded call retrieval system which can transmit the recorded conversations.

It is also an object of the invention to provide a telephone call recording and recorded call retrieval system in which recorded conversations can be retrieved via a personal computer.

It is still another object of the invention to provide a telephone call recording and recorded call retrieval system which can be implemented to automatically record, or to record only upon command.

It is still a further object of the invention to provide a telephone call recording and recorded call retrieval system which can record conference calls.

It is yet another object of the invention to provide a method of implementing a telephone call recording and recorded call retrieval system.

It is yet a further object of the invention to provide a method of telephone call recording and recorded call retrieval in which a transcript of the recorded call is provided to a subscriber.

In accord with these objects, which will be discussed in detail below, a telephone call recording and recorded call retrieval system is provided in which entire telephone calls or portions of conversations may be recorded, and the recorded conversations are stored for retrieval. In one embodiment, the system is maintained on one or more servers coupled to the PSTN, but separate from mobile and land-based telephone company switches. The system server includes telephony, call recording, and preferably call conferencing capability with cards preferably dedicated therefor coupled to the server. A subscriber calls an access telephone number for the system server and is routed to the server by the PSTN. The subscriber is verified by identification of the telephone number from which he or she is calling or by passcode. Depending on the access telephone number called, the subscriber has several options with respect to the type of recording, not all of which are necessarily provided in every embodiment of the invention. First, the subscriber can select to record dictation of the subscriber without completing a call to another person. Second, the subscriber can enter a destination telephone number and the system automatically starts to record the conversation upon answer by the called party. Third, the subscriber can enter a destination telephone number and, after the called party answers, the subscriber can selectively record any portion of the conversation upon activation of pre-assigned keys on the telephone; i.e., when the system receives particular DTMF tones or a hook/flash signal. The system server or a dedicated storage server in communication with the system server includes recorded call storage functionality, and recorded calls are transferred thereto for later retrieval. As the system is separate from the telephone company switches and accessed through one or more access telephone numbers, the system may be used from any telephone, including land-based and mobile telephones, and from any location, including home, work, car, pay-telephone, etc. As such, it does not matter that the subscriber may use a mobile carrier which is different from his or her local carrier, and that the local carrier is different from his or her long distance carrier; the access telephone number is the same regardless, and all recorded calls, regardless of which carrier was used during the call, are stored in a common location for retrieval through a common system.

According to another embodiment of the invention, the telephone call recording and retrieval system is preferably a peripheral device connected to a telephone company switch. In this embodiment, the subscriber is not required to call a telephone number for a server, but rather can place a call to a called party in a normal manner. Then, when call recording is desired, the subscriber can press one or more pre-assigned DTMF keys (including hook/flash) to initiate and later stop (and even restart and again stop) recording. The pre-assigned DTMF keys operate to initiate SS7 signalling to call the system on the peripheral and perform the desired call recording function on the peripheral. Moreover, in this embodiment, call recording can be performed when the subscriber is the called party.

In an alternative embodiment, in which the service is integrated with the telephone company services, all calls to or from the telephone company switches are routed through a server including the call recording and retrieval system, such that call recording may be initiated at any time selected by the subscriber.

In each embodiment, the recorded calls are stored in preferably compressed files, and may be accessed via telephone or a world-wide web page. Moreover, the files may be downloaded via email, hypertext transfer protocol (http) or file transfer protocol (ftp) to a personal computer for archiving and playback on the computer. Furthermore, the files may be sent electronically to a transcription center for transcription, which can then be sent to the subscriber by email, fax, etc.

Additional objects and advantages of the invention will become apparent to those skilled in the art upon reference to the detailed description taken in conjunction with the provided figures.

BRIEF DESCRIPTION OF THE DRAWINGS

FIGS. 2A and 2C are flow diagrams of another call recording embodiment according to the invention;

DETAILED DESCRIPTION OF THE PREFERRED EMBODIMENTS

Figure 1:
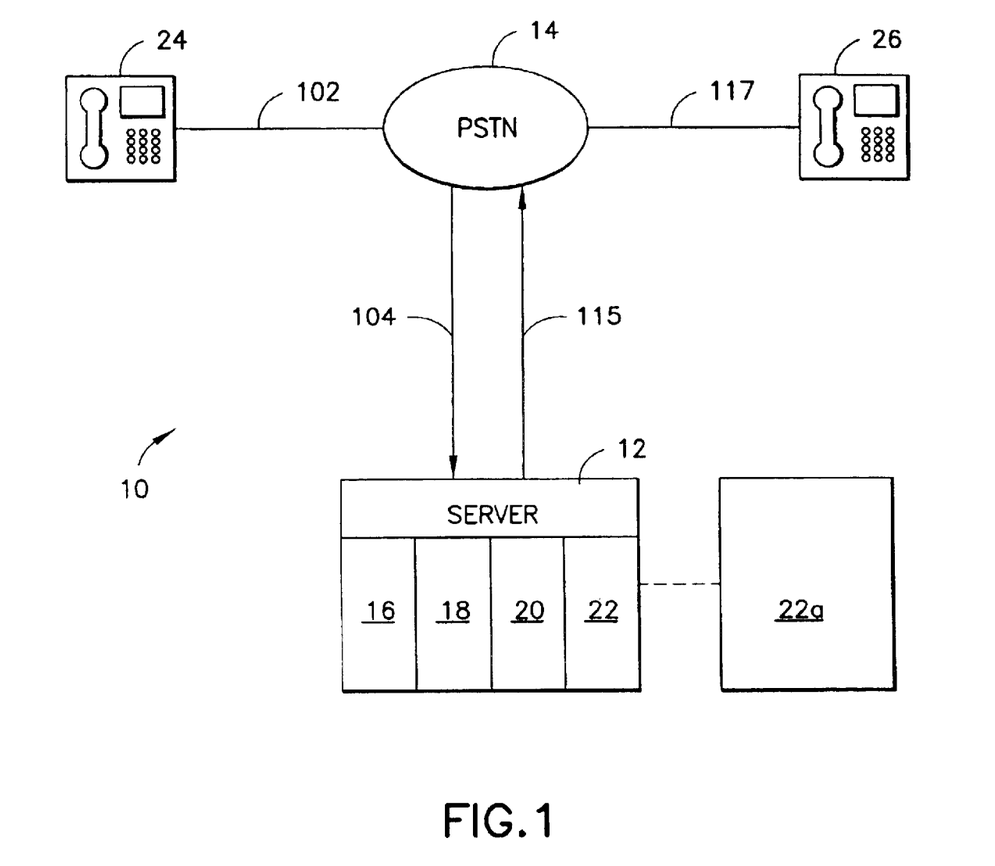
FIG. 1 is a schematic diagram of a system for telephone call recording and recorded call retrieval according to a first embodiment of the invention.

Turning now to FIG. 1, a first embodiment of a telephone call recording and recorded call retrieval system 10 is shown. The system 10 includes a server 12 in communication with the PSTN 14. For purposes herein, the PSTN includes both standard and Internet Protocol (IP) telephony networks. The server 12 includes a telephony card 16, a call recording card 18, and preferably a call conferencing card 20. The telephony card 16 allows the server to make telephone calls through both standard and IP telephony, the call recording card 18 allows the server to record telephone calls, and the call conferencing card 20 allows the server to conference three or more parties onto a telephone call. In addition, the server 12 preferably includes a memory 22 for storing recorded calls. Alternatively, a separate storage server 22a may be used for recorded call storage, and after calls are recorded, as discussed below, the recorded calls are transferred to the storage server 22a.

Figure 2A:
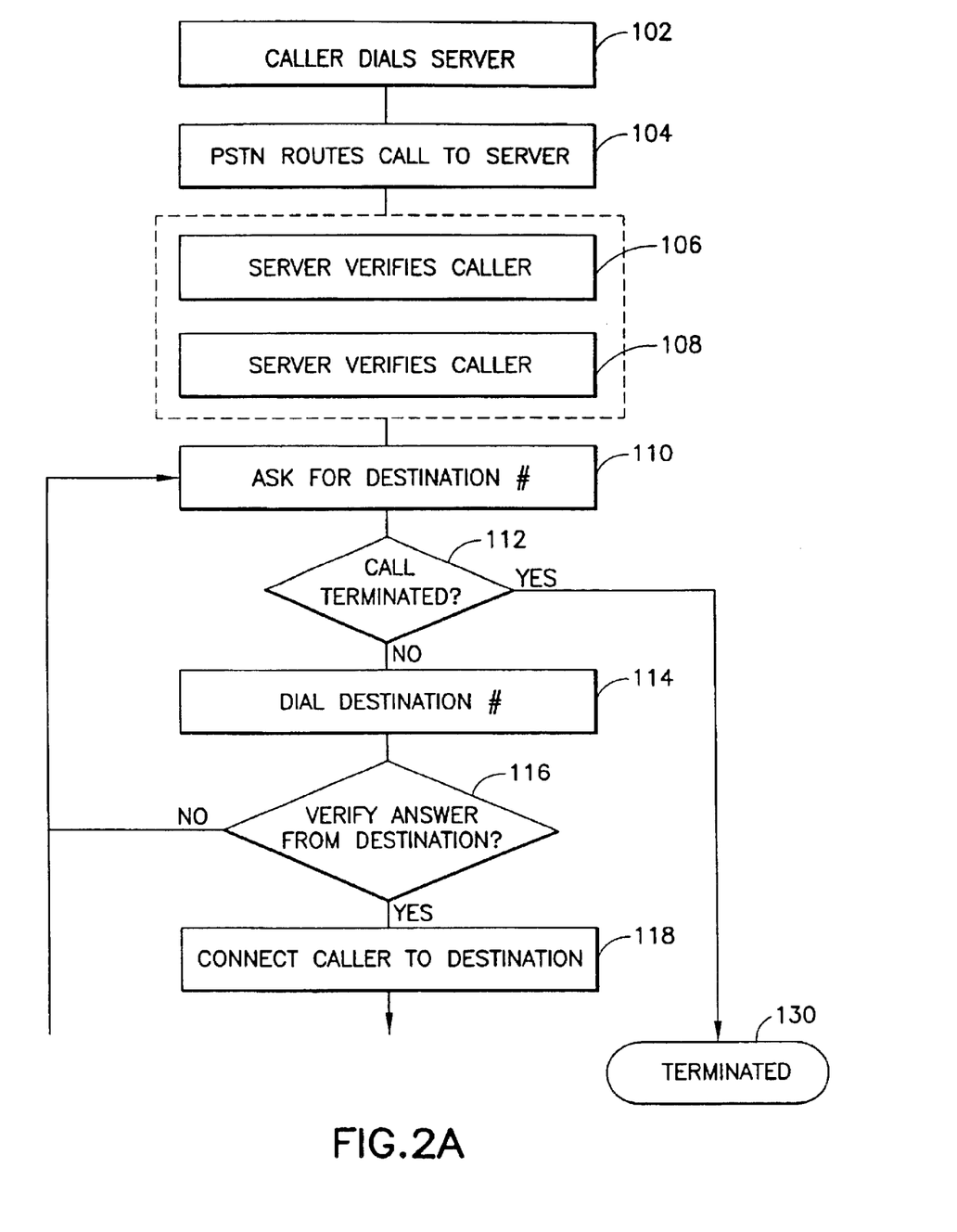
FIGS. 2A and 2B are flow diagrams of one call recording embodiment according to the invention.

The server 12 has associated therewith an access telephone number which can be called from any telephone, i.e., land-based and mobile telephones, regardless of which telephone company the user telephone is in communication. Referring to FIGS. 1 and 2A, a subscriber 24 calls at 102 an access telephone number for the server 12 and is routed at 104 to the server by the PSTN 14. As discussed below, there may be several access numbers depending on the type of recording the subscriber desires, and optionally a dedicated access number for recorded call retrieval. The server 12 then verifies at 106 the identity of the call as a subscriber. This may be done via calling line identification (commonly 'caller ID') or by a system passcode request and an appropriate passcode response by the subscriber. With respect to calling line identification, the system is adapted to store several calling line identification numbers for each subscriber; for example, one or more home numbers, an office number, a mobile telephone number, etc. When the subscriber is calling the system from a number which is not stored, e.g., when calling from a pay telephone or a hotel room, the subscriber is identified with the passcode.

The subscriber then selects, and the server verifies at 108, the type of call recording required. First, the subscriber can select to record dictation by the subscriber without completing a call to another person. Second, the subscriber can select a record option such that after the subscriber enters a destination telephone number and the called party answers, the system automatically starts to record the conversation. Third, the subscriber can select an option such that after the subscriber enters a destination telephone number and the called party answers, the system can then be operated by the subscriber to selectively record any portion of the conversation upon activation of pre-assigned keys on the telephone; i.e., when the system receives particular DTMF tones or a hook/flash signal, hereinafter for purposes of this application collectively referred to as DTMF tones. It is noted that not all of the options need be provided upon calling an access number. Moreover, the recording option can be automatically identified if different access numbers are provided for each different types of call recording. Alternatively, several access numbers may be provided for contacting the server, each access number permitting the subscriber to select a call recording type from two or more call recording options.

If the call recording option selected is of the first type, i.e., dictation, once the option is selected the call recording card 18 on the server 12 is immediately activated and the subscriber's voice is recorded. When the subscriber terminates the call (by hanging up the telephone), the call is transferred to a memory 22 on the server 12 or to a storage server 22a.

Figure 2B:
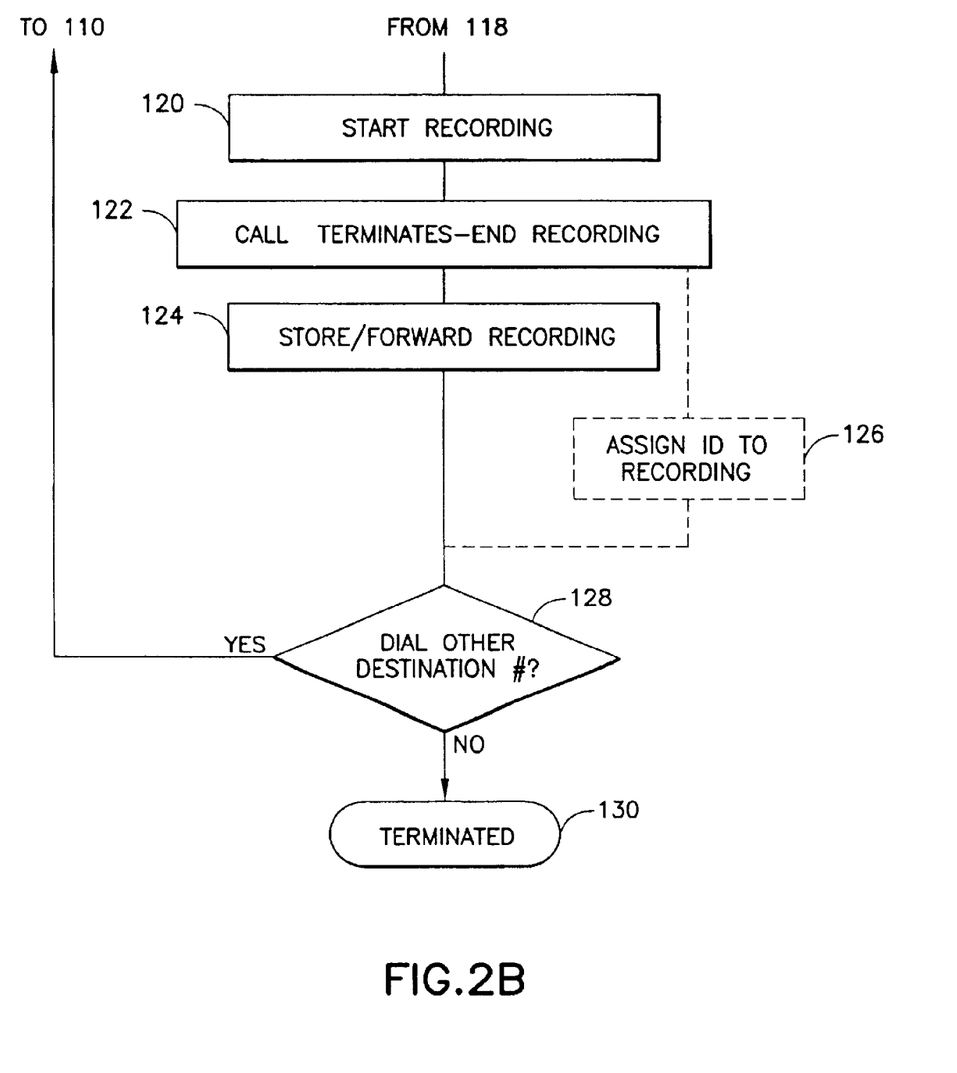

If the call recording option selected is of the second type, i.e., automatic call recording, the subscriber is requested at 110 to enter a destination telephone number. The subscriber, e.g., by failing to enter a destination number at 112, may terminate the call recording services at 130. Otherwise, the subscriber enters the number of a destination telephone 26 at 114. The server 12 then dials the number of the destination telephone through the PSTN at 115 (FIG. 1). If the telephony card 16 cannot verify an answer from the destination telephone 26 at 116, the system server 12 requests the subscriber to enter a new destination telephone number at 110. If the telephony card 16 verifies an answer 117 from the destination telephone 26, the server 12 connects the subscriber to the destination telephone 26 at 118. Referring to FIGS. 1 and 2B, the call recording card 18 then begins recording the conversation at 120. When the call is terminated at 122, recording automatically ends. Optionally, entering a pre-assigned DTMF sequence, e.g, #82, can stop the recording prior to the end of the telephone call. The recorded call is then stored at 114 in the storage memory 22 of server 12 or forwarded to storage server 22a. The recorded call is preferably stored as a compressed file, preferably in a proprietary format, to limit the required storage server capacity, and also to facilitate transfer (such as downloading) of the recorded file, as discussed below. However, the files may be stored as other compressed file formats, or as .wav files other standard audio data files. In addition, the server assigns an ID code to the recording at 126 which associates the file with the subscriber so that the file may be later retrieved by the subscriber.

When the call is ended, provided the subscriber does not hang up the telephone, the system provides the subscriber with the opportunity to make another telephone call at 128. If another call is desired to be made, the subscriber enter the destination telephone number at 110. Otherwise, the server's call recording and storage services are terminated at 130 for the subscriber at this time.

Figure 2C:
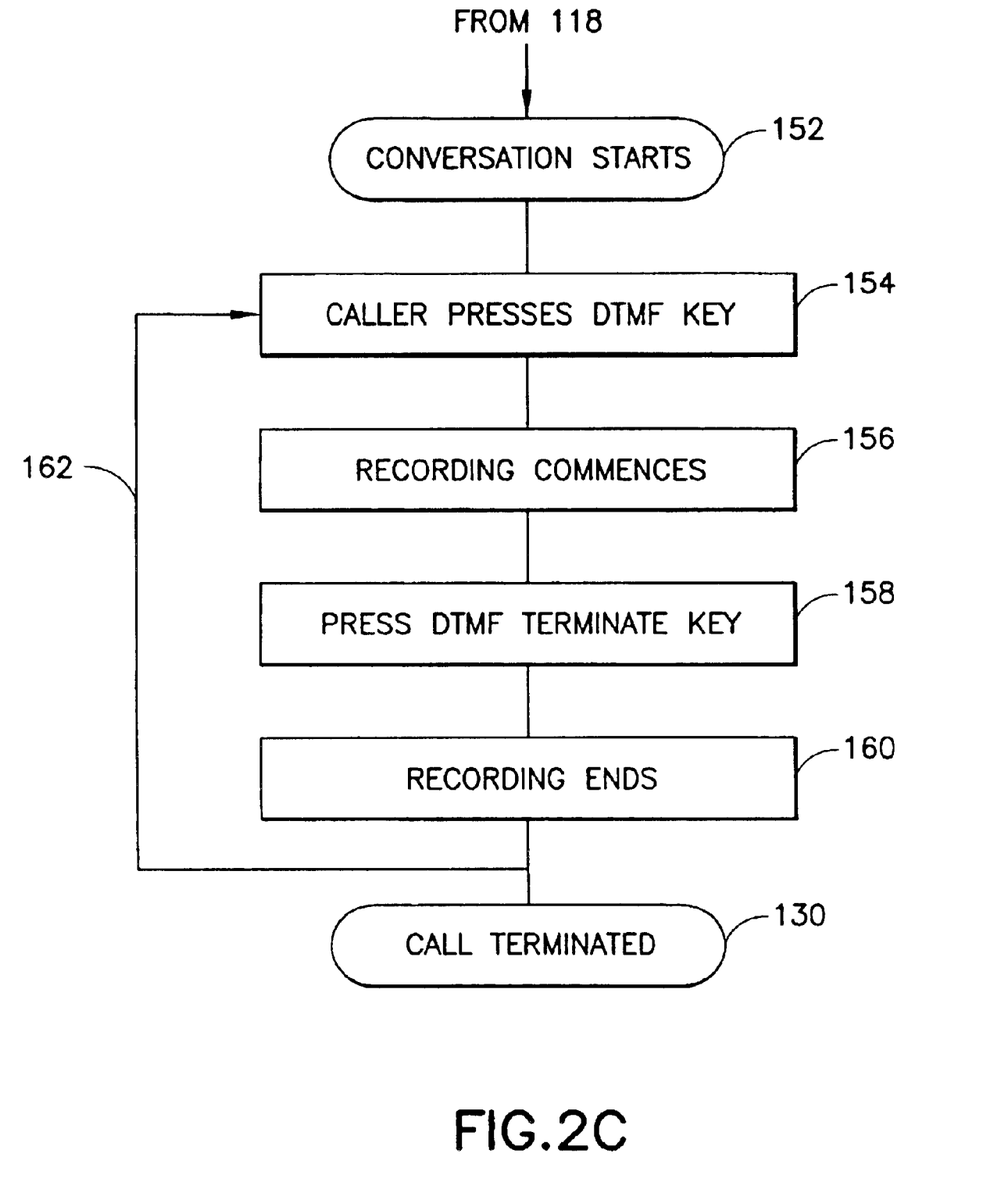

Referring now to FIG. 2C, if the call recording option selected is of the third type, i.e., selective call recording, the subscriber is prompted and responds as discussed above with respect to steps 110 through 118 such that the subscriber is connected to the called party. Once the conversation between the subscriber and the called party begins, the subscriber has the option at any time during the call to enter a DTMF key sequence at 154, e.g., #81, which initiates call recording at 156. Then, when it is desired to stop recording the conversation, the subscriber enters the same or a different DTMF key sequence at 158 to stop recording at 160. Call recording may be started and stopped multiple times during a single conversation (as indicated by arrow 162) upon activation of the required DTMF key sequence, with each subsequent call recording preferably being appended to the previous recording such that all recorded portions of a conversation are stored in a single file. This permits portions of a conversation to be outside the recording. The system optionally notifies all parties to the conversation at the start of recording and when recorded is stopped. The system services are terminated at 130 when the subscriber hangs up telephone 24.

It is preferable that there be at least two access numbers for the system server 12, one for selection of either dictation or automatic call recording, and the other for selection of either dictation or selected call recording. However, it is appreciated that a single access number may be used to select from any of the call recording options. Once the access number is dialed by the subscriber, the subscriber is provided with the recording options; for example, "enter 1 for dictation, enter 2 for automatic call recording, or enter 3 for selective call recording". If the subscriber enters "1", recording can begin immediately or at a prompt. If the subscriber enters "2" or "3", the system requests the subscriber to enter a destination number and then proceeds as described above with respect to each of the recording types.

As mentioned above, the system server preferably includes a conferencing card 20, enabling three or more parties to communicate on a telephone call. The system also provides the subscriber with the option of adding additional parties to a call, and the conversations of all the parties are recorded by the call recording card 18. Moreover, recording of the conferenced parties continues even while the subscriber may be out of the conference, e.g., on a different call. Call recording of the conference continues until the subscriber hangs up, or until all other parties in the conference hang up.

Figure 3:
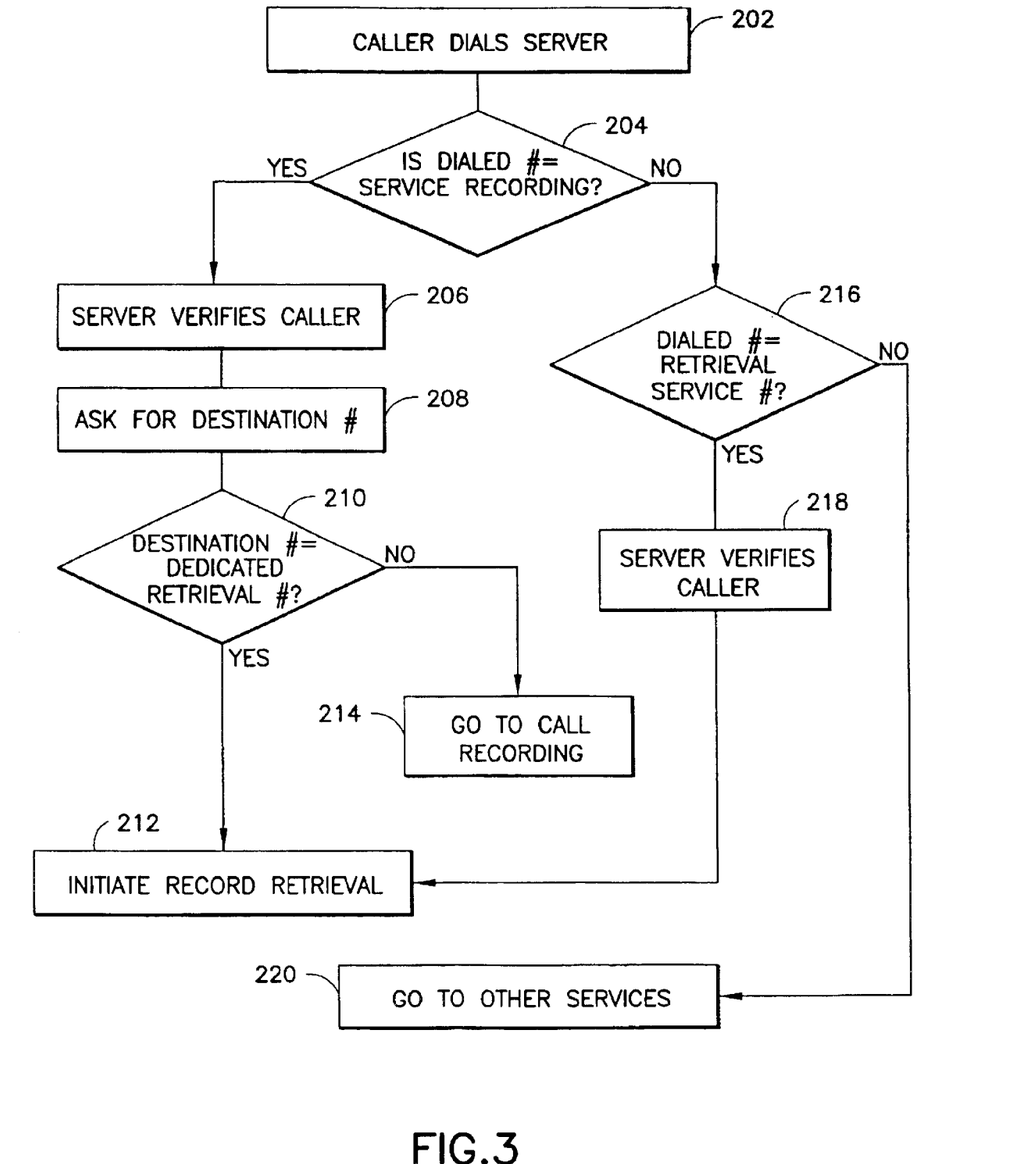
FIG. 3 is a flow diagram of a method of recorded call retrieval over a telephone according to an embodiment of the invention.

As discussed above, all recorded calls are stored as preferably compressed data files in the storage server 22a (or a memory 22 of system server 12). Turning now to FIG. 3, calls may be retrieved (listened to) by telephone preferably by either of two options. In each option, the subscriber dials the server at 202. If, at 204, the number dialed is a number generally used for selecting and initiating recording services, the server verifies the subscriber at 206, as discussed above. The subscriber is then requested to enter a destination telephone number at 208. If, at 210, the destination telephone number is a number dedicated by the system for recorded call retrieval, the system initiates recorded call retrieval services at 212. Recorded call retrieval services provides information to the subscriber identifying the stored recorded calls, e.g., for each call, the call date and time, call length, destination telephone number, an annotation provided by the subscriber at the time the recording was made, playback the first five or ten seconds of the call, and/or any other suitable identifier. The subscriber may then select the recorded call and playback the call over the telephone.

According to a second option of call retrieval by telephone, the subscriber, rather than calling a general number, calls a number specific to call recording retrieval at 216. The system server 12 verifies the identification of the subscriber at 218 and then initiates call recording retrieval at 212. It will be appreciated that other system services may be provided to the subscriber by dialing one or more other system server access numbers, as indicated at 220 and discussed below.

In addition, according to a preferred aspect of the invention, recorded calls can be retrieved, listened to and/or deleted from a personal computer in telecommunication with the system servers (e.g., over the Internet). The server includes hypertext markup language (HTML) files (web pages) to which the subscriber can log into, e.g., via username and passcode. Once logged in, a listing of stored recorded calls is displayed for review by the subscriber. The source code for the web page preferably calls an application on the server or on the personal computer which can retrieve and play a recorded call over the speakers of the personal computer. In addition, according to another preferred aspect of the invention, the recorded call files can be sent to the subscriber's email account, which is stored by the system, or can be downloaded via hypertext transfer protocol (http) or file transfer protocol (ftp) to a hard drive or removable storage media connected to the personal computer. The web page preferably also includes billing and account information for the subscriber.

In addition, other methods may be used to transfer recorded call files to a subscriber's email account stored by the system server. For example, a DTMF sequence may be entered by the subscriber at any time during the call to signal the system server to automatically forward the recorded call file the subscriber's email account at the end of the call. By way of another example, the subscriber may select an option on his or her account which automatically forwards all recorded call files to the subscribers email account. As yet another example, during recorded call retrieval by telephone, as discussed above, the subscriber is provided the option to send a selected recorded call file to his or her email account.

According to another preferred aspect of the invention, a file can be selected for transcription. When selected, the recorded call file is electronically transferred to a transcription service center where a human transcriber listens to the recorded call, and then transcribes the call conversation into a text file. The text file may be then sent to the subscriber's email account, faxed to the subscriber's facsimile number, or printed and mailed to the subscriber.

Figure 4:
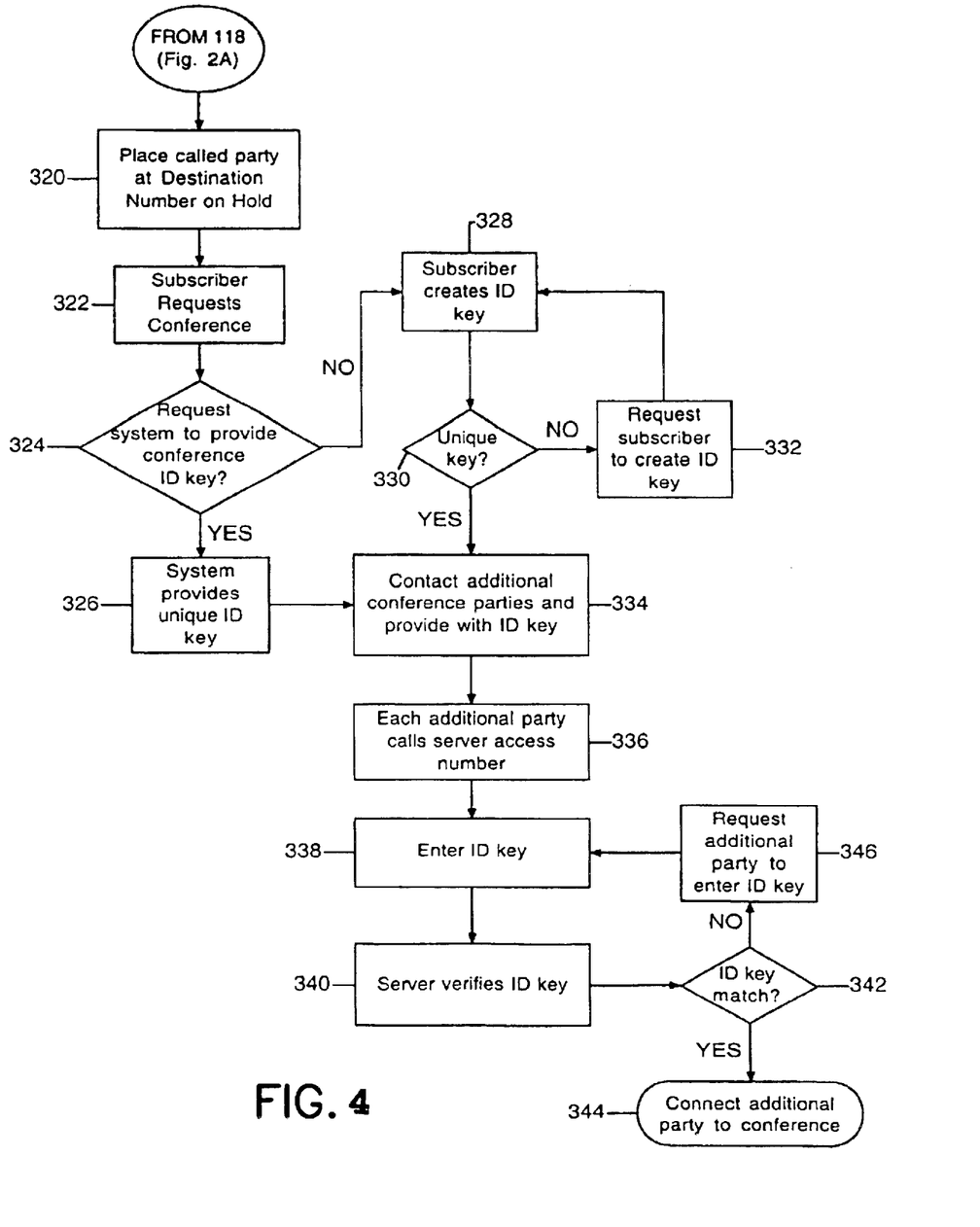
FIG. 4 is a flow diagram of a method of setting up a conference on a call according to an embodiment of the invention.

As mentioned above, the server may provide other system services. For example, the system server 12, and particularly the conference card 20 thereon, (in addition to providing typical conferencing services in which the subscriber may call and add parties to a telephone call at the subscriber's expense) is provided with the capability of setting up conferences 'on the fly' in a manner in which each conference participant bears the cost of his or her telephone call for participation. According to an embodiment of providing this functionality, the initial subscriber calls a second party by calling the server, selecting a service (such as a recording service or solely a conferencing service) and then entering a destination number, as discussed above and as shown in FIG. 2A. Now referring to FIG. 4, after the called party at the destination number answers and at any time during the conversation, the subscriber may elect to set up a conference, as follows. First, the subscriber places the called party on hold at 320, and presses one or more DTMF keys, e.g. #85, to signal the server for a conference request at 322. A conference identification key (ID key) is then created at 324. The system server 12 may then generate and provide the ID key to the subscriber at 326. Alternatively, the subscriber may create a conference ID key at 328, e.g., by entering a DTMF key sequence. If the subscriber attempts to create an ID key which is not unique; i.e., is the same as an ID key currently in use by another subscriber, the system requests the subscriber to create a different key at 332. Once a unique ID key has been created, the subscriber then contacts additional conference parties and provides the parties with the ID key at 334. The contacting of additional parties may be accomplished, for example, by email; by having a non-conference party, such as a secretary, call the parties; or by dialing the additional parties through the server, stating the conference identification key, and then hanging up with the additional parties while still maintaining a connection to the server and optionally maintaining a connection to the initial called party at the destination telephone number. The additional parties then individually call a conference access number for the server at 336. Each additional party enters the ID key at 338. The server verifies the key at 340 and, if the entered key matches an ID key active in the system at 342, the server connects the party to the conference identified with the ID key at 344. If the ID key does not match at 342, the server requests the party to re-enter the ID key at 346 until a match is provided or until a timeout is activated. At the conclusion of the conference (when all parties to the conference have disconnected from the conference) the ID key is made inactive for reuse by another subscriber. The above conferencing system permits on-the-fly conferencing in which each conferenced party bears the telephone call costs for his or her participation in the conference.

Where the telephone call recording and retrieval system is implemented as a server coupled to the PSTN, there are two preferred billing options by which to charge subscribers for services used. First, the system can bill the subscriber after the services are provided, e.g., monthly billing based upon the services used. Second, the system may operate in a pre-paid billing mode. In the pre-paid mode, the subscriber pays for services in advance, and as services (calls, recordings, call retrievals, conferencing, etc.) are used the subscriber's account is accordingly debited. The system bills the subscriber according to the type of billing listed in the subscriber account information.

According to another embodiment of the invention, the telephone call recording and retrieval system may be implemented as a peripheral (intelligent appliance) connected to a telephone company switch, such as a class 4 or class 5 switch, such that the system is entirely within the PSTN. In such an embodiment, the subscriber is not required to dial a telephone number for a server, but rather can place a call directly to a destination number in a normal manner. Then, when call recording is desired, the subscriber can press one or more pre-assigned DTMF keys to initiate and later stop recording, and then restart and stop recording, as desired. The pre-assigned DTMF keys operate to initiate SS7 signalling to call the system on the peripheral and perform the desired call recording function on the peripheral. Moreover, in this embodiment, call recording can be performed when the subscriber is the called party. As in the first embodiment, the recorded calls are stored in data files, are accessible from the world-wide web, may be sent by email to an email account, and/or may be downloaded to a personal computer.

An alternative embodiment in which the service is integrated with the telephone company services, is to route all calls from or to the telephone company through a server including the call recording and retrieval system, such that call recording may be initiated at any time selected by the subscriber.

With the above embodiments in which access numbers are not required to be dialed, conferences may also be set up and recorded. First, a telephone call is created between first and second parties. Then, one of the first and second parties may request a conference by signalling a server or appliance coupled to the telephone company switch. As described above, a unique conference ID key is created and distributed to other parties so that they may join the call. In order to join the call, a third party (and optionally other parties) dials an access number for the server or appliance, and enters the conference ID key. Upon ID key verification, the third party is conferenced to the call. Recording then proceeds as described above.

There have been described and illustrated herein several embodiments of a telephone call recording and recorded call retrieval system and a method of operating the same. While particular embodiments of the invention have been described, it is not intended that the invention be limited thereto, as it is intended that the invention be as broad in scope as the art will allow and that the specification be read likewise. Thus, while particular functional cards have been disclosed in the system server, it will be appreciated that the function provided by the cards may be integrated on fewer cards, or more particularly performed by additional cards. In addition, while only a single system server and a single storage server have been disclosed, it will be understood that additional system and storage servers may be coupled to the PSTN and/or the disclosed system and storage servers. Furthermore, while the invention has been disclosed with respect to the PSTN, it will be appreciated that the invention can be used with respect to any telecommunications network, whether wire-line or wireless. Moreover, while the signalling provided by the user to initiate and terminate recording is preferably DTMF tones, it will be appreciated that on mobile telephones, IP telephones, or other telephones which do not necessarily create DTMF tones, other signalling may be used. For example, short message service (SMS) can be used for signalling. It will therefore be appreciated by those skilled in the art that yet other modifications could be made to the provided invention without deviating from its spirit and scope as claimed.

What is claimed is:

1. A method of setting up a conference call, comprising:
  a) calling with a first telephone an access number for a server such that a first connection is created between the first telephone and the server;

b) initiating a second connection between the server and a second telephone and setting up a telephone call between the first and second telephones utilizing said first and second connections;

c) generating a conference identification code for a conference;

d) providing the conference identification code to additional parties while maintaining the connection between the first telephone and the server;

e) one of the additional parties calling with a third telephone an access number for the server such that a connection is created between the third telephone and the server;

f) entering from the third telephone the conference identification code to the server; and g) conferencing the third telephone with the first telephone;

wherein said conference identification code is generated by said first telephone in response to user interaction with said first telephone and communicated from said first telephone to said server.

2. A method of setting up a conference call, comprising:

a) calling with a first telephone an access number for a server such that a first connection is created between the first telephone and the server;

b) initiating a second connection between the server and a second telephone and setting un a telephone call between the first and second telephones utilizing said first and second connections;

c) generating a conference identification code for a conference;

d) providing the conference identification code to additional parties while maintaining the connection between the first telephone and the server;

e) one of the additional parties calling with a third telephone an access number for the server such that a connection is created between the third telephone and the server;

f) entering from the third telephone the conference identification code to the server; and g) conferencing the third telephone with the first telephone;

wherein said conference identification code is generated by said server and communicated from said server to said first telephone.

3. A method of setting up a conference call, comprising:

a) creating a first telephone call between a first telephone and a second telephone;

b) requesting a conference with the first telephone;

c) generating a conference identification code for the conference;

d) providing the conference identification code to additional parties while maintaining the connection between the first telephone and the second telephone;

e) one of the additional parties calling with a third telephone an access number for a conference appliance;

f) entering from the third telephone the conference identification code to the conference appliance; and g) conferencing the third telephone with the first telephone;

wherein said conference identification code is generated by said first telephone in response to user interaction with said first telephone and communicated from said first telephone to said server.

4. A method of setting up a conference call, comprising:

a) creating a first telephone call between a first telephone and a second telephone;

b) requesting a conference with the first telephone;

c) generating a conference identification code for the conference;

d) providing the conference identification code to additional parties while maintaining the connection between the first telephone and the second telephone;

e) one of the additional parties calling with a third telephone an access number for a conference appliance;

f) entering from the third telephone the conference identification code to the conference appliance; and g) conferencing the third telephone with the first telephone;

wherein said conference identification code is generated by said server and communicated from said server to said first telephone.

5. A method of setting up a conference call, comprising:

a) creating a first telephone call between a first telephone and a second telephone;

b) requesting a conference with the first telephone;

c) generating a conference identification code for the conference;

d) providing the conference identification code to additional parties while maintaining the connection between the first telephone and the second telephone;

e) one of the additional parties calling with a third telephone an access number for a conference appliance;

f) entering from the third telephone the conference identification code to the conference appliance; and g) conferencing the third telephone with the first telephone.

6. A method of setting up a conference call, comprising:

a) calling with a first telephone an access number for a server such that a first connection is created between the first telephone and the server;

b) initiating a second connection between the server and a second telephone and setting up a telephone call between the first and second telephones utilizing said first and second connections;

c) generating a conference identification code for a conference;

d) providing the conference identification code to additional parties while maintaining the connection between the first telephone and the server;

e) one of the additional parties calling with a third telephone an access number for the server such that a connection is created between the third telephone and the server;

f) entering from the third telephone the conference identification code to the server; and g) conferencing the third telephone with the first telephone.

7. A method according to claim 6, wherein:

the one of the additional parties pays for the cost of the connection between the third telephone and the server.

* * * * *